United States Patent [19]
Aoshima

[11] Patent Number: 5,339,426
[45] Date of Patent: Aug. 16, 1994

[54] SYSTEM AND METHOD FOR RESUME PROCESSING INITIALIZATION

[75] Inventor: Kinya Aoshima, Fussa, Japan

[73] Assignee: Toshiba America Information Systems, Inc., Irvine, Calif.

[21] Appl. No.: 162,359

[22] Filed: Dec. 7, 1993

[51] Int. Cl.⁵ .............................. G06F 9/06
[52] U.S. Cl. ...................... 395/700; 364/DIG. 1; 364/280.8; 364/280.3; 364/270.2
[58] Field of Search ............... 395/550, 700, 725, 750; 364/DIG. 1 MS File

[56] References Cited
U.S. PATENT DOCUMENTS 4,432,049 2/1984 Shaw et al. .................. 364/DIG. 1
4,779,187 10/1988 Letwin ........................... 395/725

Primary Examiner—Thomas M. Heckler
Attorney, Agent, or Firm—Banner, Birch, McKie & Beckett

[57] ABSTRACT

A resume processing driver for an advanced operating system, such as OS/2, is provided which saves data indicative of the operating conditions of the advanced operating system into system memory and then calls a previously existing resume processing routine designed for a previously existing operating system, such as MS-DOS. The previously existing resume processing routine performs additional processing in order to save operating condition data associated with the previously existing operating system into system memory, and then performs a controlled power off sequence and removes the power supplied to all elements of the computer except the computer memory. Thereafter, the existing resume processing routine performs processing to restore the operating condition data associated with the previously existing operating system from system memory and then passes control to the resume processing driver of the present invention. The resume processing driver restores the data indicative of the operating conditions of the advanced operating system from system memory, and control then passes to the computer program which was executing before the resume processing driver was initiated.

12 Claims, 10 Drawing Sheets

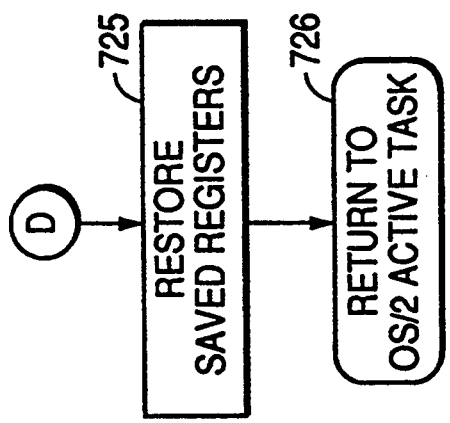
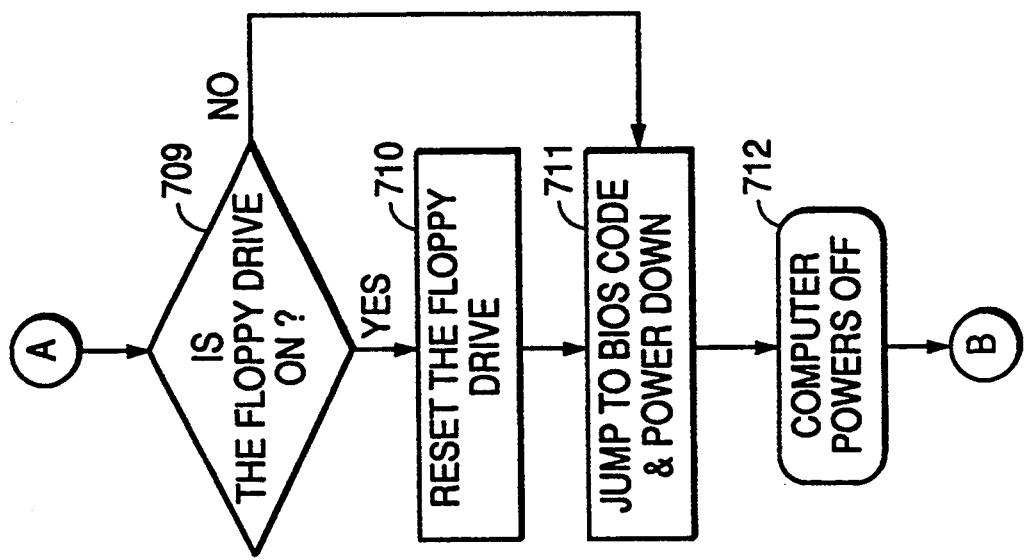

SYSTEM AND METHOD FOR RESUME PROCESSING INITIALIZATION

BACKGROUND OF THE INVENTION

1. Field of the Invention

The present invention generally relates to a resume processing control system for use in a computer system, and more particularly, to a method for saving the status of a computer system operating under the OS/2 operating system in response to a power-off signal, removing power from the computer system, and subsequently re-applying power to the computer system so that the computer system returns to its original state.

2. Description of the Prior Art

In a conventional computer system, such as an "IBM compatible" microcomputer based upon an 80×86 microprocessor or equivalent, the contents of registers and memory locations associated with the underlying microprocessor are generally lost when the power is removed from the system. Thereafter, when power is restored to the computer system, the system executes initialization steps to place the system in an initial state. In this case, any computer program and accompanying data existing within the system before the power was removed must be re-loaded.

In recent years, "resume" functionality has been added to certain computer systems—most notably the Toshiba line of laptop microcomputers—to allow the computer system to save its operating conditions before power is removed, and to resume processing at the same point when power is subsequently restored. This functionality is accomplished by maintaining a supply of power to the computer's low-power dynamic memory while removing such power to the devices requiring a larger amount of power, such as the display and the disk drives. This power consumption preservation functionality allows computer systems which posses only a limited power supply, such as battery operated laptop computers, to maintain the current state of the computer system while minimizing the amount of necessary power consumption.

For example, the built-in resume feature found on the Toshiba line of laptop computers (referred to as AutoResume TM on these machines) allows the user to power off the computer (thus saving battery power) without losing data. This functionality is built into the Basic Input/Output System (BIOS) routines found within the computer's read-only memory (ROM). The resume function is accomplished by saving all necessary register information into random access memory (RAM) and retaining power to that memory while disabling power to the other computer devices. When normal power is restored, the saved information is returned to the registers and the machine is returned to its previous state.

This feature is useful if the user intentionally shuts down the machine to preserve battery life, but an added benefit occurs when the battery power reaches a critically low level. At this point, the machine will warn the user (e.g. by beeping) that the batteries are near depletion. If the user fails to shut down the machine within a given amount of time (approximately five minutes), the computer will automatically go into "resume mode" and shut itself off. When normal power is re-applied, the BIOS will restore the computer to its original state with no loss of data and without any interruption in execution of the previously running program.

Unfortunately, the resume processing BIOS code presently built into such laptops supports the resume function under the MS-DOS operating system only. When run under a different operating system, such as OS/2 which is a multi-tasking operating system available from Microsoft Corporation of Redmond, Wash., the present BIOS resume function does not properly save certain registers and other data used by OS/2, and the resume function operation thereby fails. This is due, in part, to the fact that the OS/2 operating system was designed to operate on a computer system utilizing a multi-mode 80286 microprocessor or a microprocessor downwardly compatible with the 80286, such as the 80386, 80486, etc. On the other hand, the MS-DOS operating system was designed to operate on an 8086/8088 microprocessor utilizing only one mode.

As a result, in order to utilize the existing resume processing BIOS present in such computers, a "wrapper" must be created around the BIOS to place the computer into a state upon which the BIOS may perform its resume processing functions. The present invention is designed to perform such functionality.

SUMMARY OF THE INVENTION

Accordingly, it is an object of the present invention to provide a resume processing function for use with an advanced operating system such as OS/2.

It is a further objective of the present invention to provide a resume processing function for use with OS/2 in conjunction with an existing resume processing routine, such as the MS-DOS resume processing BIOS routine.

It is yet another object of the present invention to provide a resume processing function which acts as a "wrapper" around an existing resume processing routine.

It is yet another object of the present invention to provide a resume processing function which saves data indicative of the operating system operating conditions before an existing resume processing routine is called.

It is yet another object of the present invention to provide a resume processing function which restores data indicative of the operating system operating conditions after an existing resume processing routine has been executed.

It is yet another object of the present invention to provide a resume processing function which is able to function while both a disk drive and a parallel printer port are active.

In accordance with the present invention, a resume processing driver for an advanced operating system, such as OS/2, is provided which saves data indicative of the operating conditions of the advanced operating system into system memory and then calls a previously existing resume processing routine designed for a previously existing operating system, such as MS-DOS. The previously existing resume processing routine performs additional processing in order to save operating condition data associated with the previously existing operating system into system memory, and then performs a controlled power off sequence and removes the power supplied to all elements of the computer except the computer memory. Thereafter, the existing resume processing routine performs processing to restore the operating condition data associated with the previously existing operating system from system memory and then passes control to the resume processing driver of the present invention. The resume processing driver restores the data indicative of the operating conditions of the advanced operating system from system memory, and control then passes to the computer program which was executing before the resume processing driver was initiated.

BRIEF DESCRIPTION OF THE DRAWINGS

FIGS. 7(a)–7(e) are flow diagrams showing the various steps which are performed when the resume driver of the present invention is invoked.

DETAILED DESCRIPTION

Figure 1:
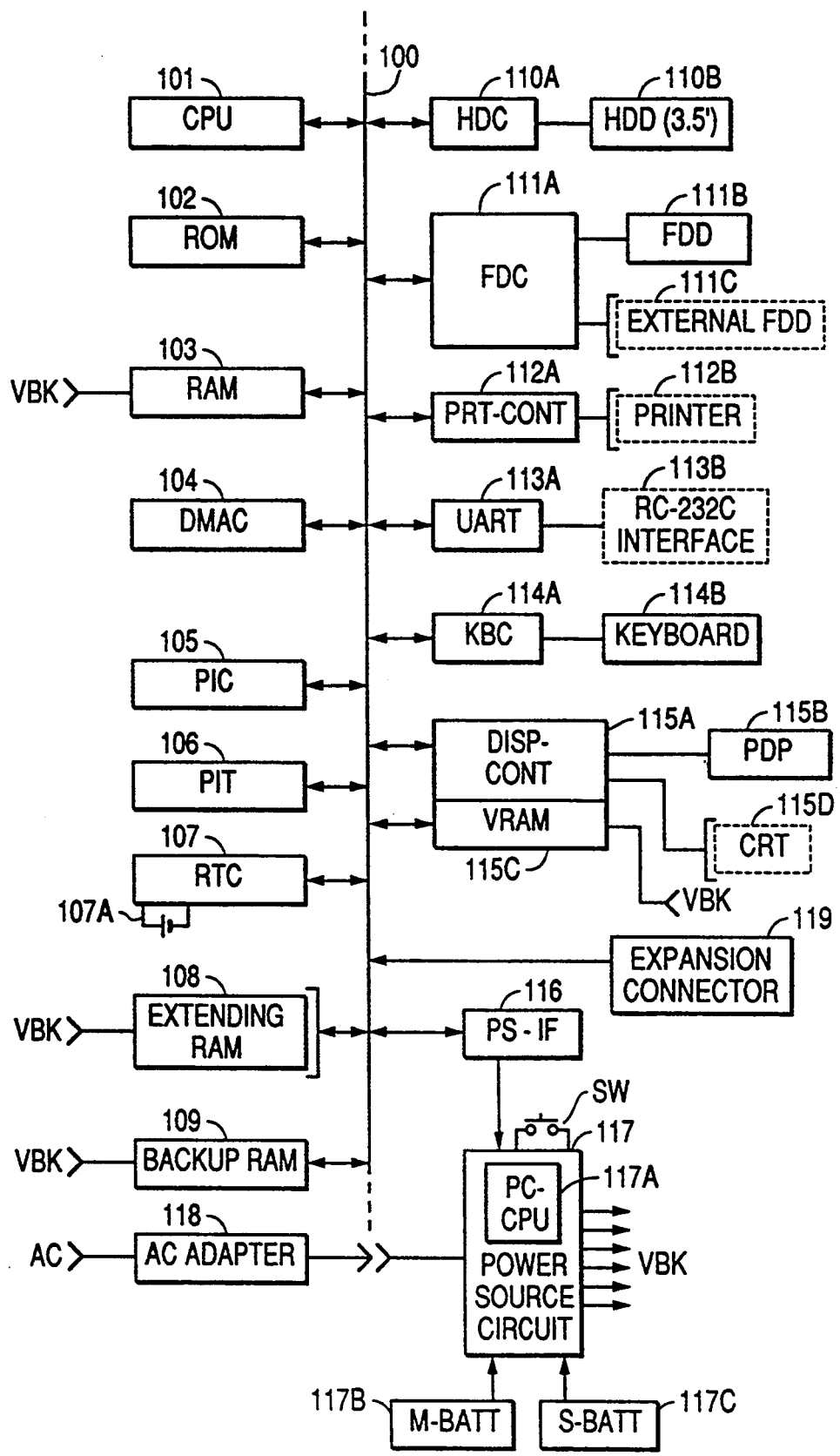
FIG. 1 is a block diagram showing the various components of a computer with which the OS/2 resume device driver of the present invention may operate in a preferred embodiment.

In order to appreciate the detailed discussion that follows, the following terms will now be defined:

A20 GATE: A gate within the keyboard controller which enables or disables address line 20. Address line 20 can be enabled or disabled under MS-DOS depending upon whether a program needs access to an extra 64K memory segment above 1 MByte. However, OS/2 usually needs this address line enabled, because base device drivers reside above the 1 MByte segment.

COM DRIVER: A COM driver is an asynchronous communications port driver.

CPU: The Central Processing Unit is a microprocessor which forms the central control circuitry in the computer system. For purposes of the present invention, the CPU comprises a microprocessor which is capable of operating in advanced operational modes, such as a protected mode, and which is capable of running an advanced operating system, such as OS/2.

DESCRIPTOR TABLE: A descriptor table is a table that maps selectors to physical memory addresses. Such tables are used by advanced microprocessors, such as the Intel 80286, to define segments of memory for a computer program's use. There are two types of tables which are relevant to the present invention: The local descriptor table (LDT) and the global descriptor table (GDT). An LDT exists for each active process and allows access to memory that is owned or shared by that process. The GDT allows access to memory that is used by the operating system and device drivers.

HOOK or HOOKING an Interrupt: Hooking an interrupt refers to the act of redirecting the CPU to access a new interrupt handler. The actual "hook" must be performed before the interrupt occurs. This is typically done by placing the address of the new handler in the appropriate location in an interrupt vector table. However, this is not always possible with the NMI interrupt of the Intel 80286-compatible line of microprocessor where the operating system kernel constantly polices the interrupt vector table and restores the original handler's address if some other program changes it. Therefore, in order to hook the NMI interrupt, the present invention places a "jump" microprocessor instruction at the beginning of the original handler which passes execution to the resume processing driver of the present invention.

I/O CHANNEL CHECK or PARITY ERROR: This is a fatal system error caused by an expansion board detecting an I/O parity error in the hardware.

NMI: A non-maskable interrupt is one that cannot be ignored by the CPU, although it may be masked off external to the CPU. For example, on the Toshiba T3100SX laptop computer, there are two ways an NMI may be generated: (1) by an I/O channel check error, or (2) by a power down request as described according to the present invention.

PIC: A programmable interrupt controller is a circuit which controls which interrupts are enabled/disabled at any given time.

RESUME or RESUMING: Resuming is the act of shutting off power to the computer (except for memory) and restoring it at a later date while preserving the software state of the machine.

RING: The ring is the privilege level recognized by the 80286-compatible line of microprocessors under which an executing program may operate. OS/2 code can execute at one of three levels: 0, 2 and 3. Level 1 is not utilized. The current privilege level determines which instructions and memory segments can be accessed.

SELECTOR:

A selector is a value that is used in the protected mode of an advanced microprocessor, such as the 80286-compatible line of microprocessor, which can be loaded into a segment register to reference a physical memory segment. The selector is used as an index into a descriptor table (either the LDT or the GDT).

TILED: A tiled memory address value is valid in both real mode (as a segment), and in protected mode (as a selector). The system loader is an example of a code segment that is tiled.

In a preferred embodiment, the implementation of the present invention involves (1) creating a resume driver capable of operating under the OS/2 Version 1.2 operating system in order to hook the NMI interrupt vector as well as to act as a wrapper around the Resume BIOS code, (2) modifying the system loader in order to insert a hook into the real mode non-maskable interrupt (NMI), thereby allowing the present invention to operate under OS/2's DOS compatibility Box, (3) modifying the system initialization process to place the resume driver load statement in the "CONFIG.SYS" file when installing on an appropriate machine, and (4) modifying the disk driver to signal to the Resume BIOS when disk activity has subsided so that the power may be removed without losing disk buffers or data. As will be explained in the detailed discussion below, all of these components will have to be written or modified in order to fully support the resume function under OS/2 Version 1.2, but it will be readily understood by one of ordinary skill in the art that the described modifications and additions will define only one implementation of the present claimed invention, and that other obvious variations will be apparent from the discussion.

As will also be readily understood by one skilled in the art of computer programming, the above components may be implemented by writing or modifying computer programs written in one of a variety of computer languages. In the preferred embodiment, 80x86-compatible assembly language (machine language) is used to implement the present invention, because the present invention is being implemented as a device driver. However, when implementing the resume driver, for example, any other suitable language could also conceivably be used. In the context of this detailed description, it will be assumed that assembly language is being used, unless otherwise noted.

Also, the Microsoft Macro Assembler Version 5.10 and the Microsoft Segmented-Executable Linker Version 5.03 (both available from Microsoft Corporation of Redmond, Wash.) may be used to assemble and link the device driver and other source code of the present invention, although other similar products could also be used.

In addition, the above components are readily examined and modified through the use of the Binary Adaptation Kit (BAK) and related software tools and manuals available from Microsoft Corporation of Redmond, Wash., the authors of the OS/2 operating system. The BAK includes the Binary Adaptation Guide (BAG) which provides documentation regarding how to implement the modifications and additions described in this specification. In addition to this documentation, additional books might prove useful when implementing the present invention, such as the book, "Advanced OS/2 Programming" by Ray Duncan, available from Microsoft Press of Redmond, Wash.

Finally, when debugging an implementation of the present invention, the kernel debugger, also available from Microsoft, may be used in order to locate errors within the driver. However, keep in mind that one cannot hook the real mode NMI interrupt vector using this debugger because it hooks this vector itself. Therefore, debugging the real mode NMI processing must be done by visual inspection of the code or by strategically placing halt statements in the code to see if the execution path crosses a certain path.

In order to fully test the resume driver of the present invention, an I/O channel check error must be generated in both protected mode and real mode. Since this is something that is not producible with software and is normally not producible with hardware, an expansion chassis may be utilized to perform this function. In the preferred embodiment, the Toshiba expansion chassis with an expansion board with one wire soldered onto the A1 line may be utilized, and may be connected to the expansion connector of the computer (element 119 of FIG. 1). In order to produce an I/O NMI at will, the A1 wire may be briefly grounded, which will immediately produce an I/O channel check NMI.

FIG. 1 is a block diagram corresponding to a microcomputer with which the present invention may operate in a preferred embodiment. The specific microcomputer portrayed in FIG. 1 may be any one of a variety of microcomputers possessing an "intelligent" power supply and capable of running OS/2, such as the Toshiba T3100SX or T2000SX "laptop" computers. While the specific configuration shown in this figure may vary from computer to computer, the relevant portions of the computer system necessary to the operation of the present invention (including the "intelligent" power supply) will remain essentially the same, and therefore, it will be understood that FIG. 1 is included for illustrative purposes only.

Referring to FIG. 1, system bus 100 is connected to system components 101 to 125. Central Processing Unit (CPU) 101, which in a preferred embodiment may consist of an Intel 80286-compatible microprocessor capable of running the OS/2 Version 1.2 operating system, controls the functioning of the entire computer system of FIG. 1. In the preferred embodiment, CPU 101 performs the functions outlined in flowcharts of FIGS. 5-6 and 7(a)-7(e), which will be described in detail below. In addition, CPU 101 serves as a host CPU relative to power control CPU 117A which forms the heart of power source circuit 117, which will also be described in detail below.

Read-Only Memory (ROM) 102 stores fixed computer programs and accompanying data, including the ROM Basic Input/Output System (BIOS) (not explicitly shown). In a preferred embodiment, the ROM BIOS stores a resume processing program which is capable of operating with the real mode of CPU 101. For example, the T3100SX laptop computer available from Toshiba Corporation utilizes the 80386SX microprocessor as CPU 101 and possesses a resume processing program within its ROM 102 which is designed to operate when the 80386SX microprocessor is in its real mode.

Random Access Memory (RAM) 103 stores modifiable programs and data to be processed by CPU 101. In addition, RAM 103 stores a resume mode flag which indicates to an executing program whether resume processing should be utilized. This flag will be discussed in detail below.

Direct Memory Access (DMA) controller 104 controls direct memory accesses between various components of the microcomputer system. Programmable Interrupt Controller (PIC) 105 controls which microprocessor interrupts are enabled at any given time and may be modified by a computer program executing on CPU 101. Programmable Interval Timer (PIT) 106 may be set by an executing computer program and counts down a specified time interval. Real Time Clock (RTC) 107 maintains and provides the current time of day to CPU 101 and has a dedicated power supply 107A (e.g. a battery) in order to keep it operational when the power supply is removed from the microcomputer system.

Extension RAM 108, having a relatively large memory capacity, may be inserted into a dedicated card slot of the main body of the microcomputer and is supplied with a backup power supply VBK. Resume function data may be stored in backup RAM 109, which is also supplied with backup power VBK.

A hard disk pack may be removably inserted in a dedicated housing section of the main body of the microcomputer system, and in a preferred embodiment comprises a 3.5 inch hard disk drive (HDD) 110B and a hard disk controller (HDC) 110A for controlling access to the drive. The following controllers control access to and connect their respective counterparts to bus 100: Floppy disk controller (FDC) 111A connects floppy disk drive (FDD) 111B and/or optional external floppy disk drive (external FDD) 111C; printer controller (PRT-CONT) 112A connects an optional printer 112B; Universal Asynchronous Receiver (UART) 113A connects an optional RS-232C interface unit 113B; keyboard controller (KBC) 114A connects keyboard 114B; and display controller (DISP-CONT) 115A connects gas plasma display (PDP) 115B and optional cathode ray tube (CRT) 115D.

Associated with DISP-CONT 115A is video RAM (VRAM) 115C for storing display image data. VRAM 115C is supplied with backup power supply VBK.

Power source control interface (PS-IF) 116 connects power source circuit 117 to CPU 101 through system bus 100. When power control CPU (PC-CPU) 117A receives an indication from the user of the microcomputer system by means of activation of switch SW, power control CPU 117A causes power source circuit 117 to send a non-maskable interrupt (NMI) signal to CPU 101 through PS-IF 116. In addition, an NMI signal may be generated by power source circuit 117 when the power supplied by main battery (M-BATT) 117B (discussed below) falls below a critically low level.

AC adapter 118 rectifies and smooths a commercially available alternating current (AC) power source to obtain a direct current power source of a specified voltage. AC adapter 118 is connected to power source circuit 117 which supplies power to the respective components of the microcomputer system.

Main battery (M-BATT) 117B, consisting in a preferred embodiment of a removable rechargeable battery, is connected to power source circuit 117. Sub-battery (S-BATT) 117C, consisting in a preferred embodiment of a rechargeable battery attached to the inside of the computer body, operates as a secondary battery and is connected to power source circuit 117.

Finally, expansion connector 119 is connected to bus 100 to allow for connection of external circuitry and components.

Figure 2:
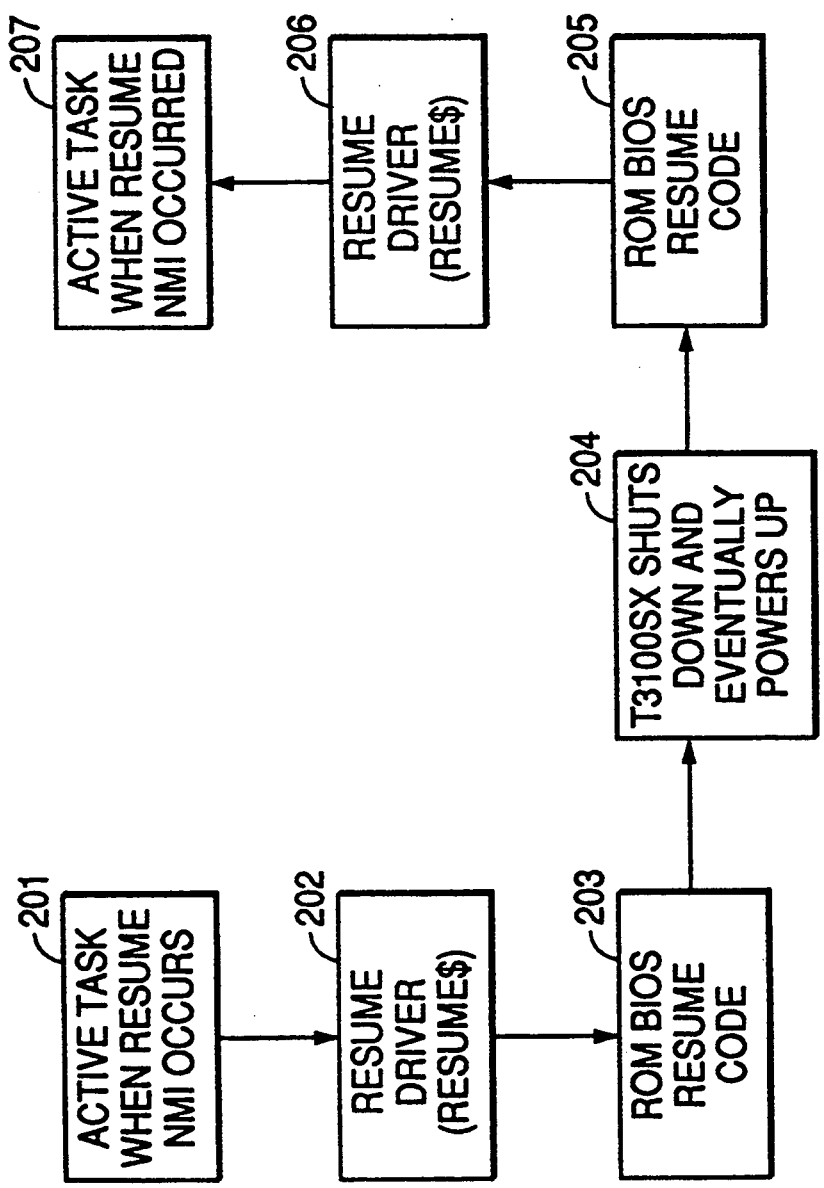
FIG. 2 is a flow diagram showing the seven general steps which the present invention performs in a preferred embodiment.

Referring to FIG. 2, a flow diagram is shown depicting the overall flow of the resume processing function of the present invention. Specifically, during the course of operation of the present invention in a preferred embodiment, seven (7) general steps occur, shown in FIG. 2 as steps 201–207. These seven steps will be generally described below, and will be described in further detail later in reference to FIGS. 7(a)–7(e).

First, step 201, entitled "Active Task When Resume NMI occurs", refers to the state in which the computer system is operating when a signal is received to begin resume processing. Specifically, a computer program may be operating under one of the plurality of operating modes of the host CPU (element 101 in FIG. 1) when a power-down signal is received by the CPU. The power-down signal is generated by the power source circuit (element 117 in FIG. 1) when the user of the computer system activates the appropriate power switch (element SW in FIG. 1). The power-down signal takes the form of a non-maskable interrupt (NMI) being generated on the CPU.

Step 202, entitled "Resume Driver (RESUME$)", refers to the resume processing driver which is executed after the NMI is detected by the CPU. In a preferred embodiment, the resume driver takes the form of an installable device driver which is loaded when the computer is first initialized. Specifically, the filename of the driver is placed into the "CONFIG.SYS" configuration file with the "DEVICE=" statement, and is loaded when the computer system is initially booted. It is important to note that the resume processing driver of the present invention could possibly be implemented just as well as part of the OS/2 "base drivers" (e.g. part of BASEDD01) or as part of the OS/2 OEMHLP drivers. However, in order to minimize the amount of redesign of the current OS/2 system, and because the resume processing driver of the present invention is designed to be utilized with a certain type of machine, the resume processing driver of the present invention takes the form of an installable device driver according to the preferred embodiment. However, one of ordinary skill in the art will appreciate the various ways in which the present invention could be implemented.

Referring again to step 202, the resume processing driver of the present invention is executed after the NMI is detected by the CPU and the NMI is determined to be a result of the power-down switch being pressed. At this point, the resume driver performs various steps in order to properly save certain types of data associated with OS/2 into appropriate areas in the computer system's memory. After this is performed, the resume driver then transfers control to pre-existing ROM BIOS resume code which performs further resume processing functions and then physically removes power supplied to the various components of the computer system, except the memory. Thus, the resume driver of the present invention, depicted in step 202, serves as a "wrapper" around the pre-existing ROM BIOS currently found in various computer systems, such as Toshiba laptops. That is, the resume driver saves the registers and data unique to the OS/2 operating system and/or the advanced microprocessor upon which OS/2 operates and places the computer system into a state in which the standard ROM BIOS resume processing routine is able to properly perform its functionality and thereafter remove power from the various components.

Step 203 of FIG. 2, entitled "ROM BIOS Resume Code" refers to the ROM BIOS resume code routines which are executed after the resume driver of the present invention is executed, as previously described. In the preferred embodiment, the ROM BIOS resume code is designed to save all of the necessary registers and data associated with the computer systems CPU (element 101 of FIG. 1) when operating in the "real mode". Therefore, before the resume driver in step 202 transfers control to the ROM BIOS resume code of step 203, the resume driver of the present invention places the CPU into the real mode, if not already operating in this mode. This process will be described in further detail later.

After the ROM BIOS resume code performs all necessary steps in order to save the registers and data associated with the real mode, step 204 is encountered, entitled "Computer Shuts Down and Eventually Powers Up". In the preferred embodiment, this steps consists of removing power from all components of the computer system, except, of course, to the system memory, which stores the previously saved registers and data associated with the state of the computer system. Power is removed under direction of the CPU by the power source circuit (element 117 in FIG. 1). When the user presses the power switch (element SW in FIG. 1) at a later time, the power source circuit will re-supply power to the various components of the computer system, and then control will be transferred to step 205.

Step 205, entitled "ROM BIOS Resume Code", performs the opposite function as step 203, and refers to the same ROM BIOS resume routines of step 203 which were executing when power was removed in step 204. Step 205 consists of restoring the previously saved registers and data associated with the real mode of the microprocessor and then transferring control back to the resume driver in step 206. As explained previously, the ROM BIOS code of step 205 consists of code previously found in Toshiba computers, such as the T3100SX laptop computer.

Step 206, entitled "Resume Driver (RESUME$)", performs the opposite function as step 202, and is handled by the same driver as in step 202. Step 206 consists of restoring the previously saved registers and data associated with OS/2 and the related advanced modes of the 80286-compatible microprocessor. After step 206 is completed, control is then passed to step 207, entitled "Active Task When Resume NMI occurred", which refers to the program which was executing when the power switch was originally pressed to begin the resume process in step 201. At this point, the previously executing program is resumed.

As described before, in order to support the resume functionality of the present invention, the present invention must necessarily "hook" the Non-maskable interrupt (NMI) (interrupt 2) to point to the resume device driver in order to detect when the user of the computer system has pressed the power switch (element SW in FIG. 1). However, this is not possible with the NMI interrupt handler because the system kernel constantly polices the interrupt vector table and restores the original handler's address if some other program changes it. In order to circumvent this limitation, the resume driver of the present invention must necessarily "patch" over OS/2 loader and kernel code in order to hook the NMI interrupt for the real and the 80286 protected modes. While this practice is normally not considered good technique, it must be performed in a preferred embodiment because of the inability of modifying the vector tables directly. The details involved in "hooking" (e.g. patching) the NMI interrupts will be described below relative to FIGS. 3 and 4. If, in a future release of OS/2, it becomes possible to modify the interrupt vector entries directly, then the patching process herein described will, of course, become unnecessary, and a direct modification of the vector entries may be made.

The initialization code for the resume driver of the present invention is responsible for "hooking" the real and protected mode NMI vectors. The real mode NMI vector is located within the interrupt vector table (IVT), and the protected mode NMI vector is located within the interrupt descriptor table (IDT). As described above, the OS/2 kernel routinely polices these tables and overwrites any new values placed within the tables after it is loaded. Therefore, as described previously, rather than directly changing the location of the interrupt handlers as specified in the IVT and IDT, an alternative solution is to leave the original vectors intact and to instead modify the first steps of each handler to execute a far jump machine language instruction to the resume driver of the present invention. This method assumes that we will never need to jump back to the original handler because it actually overwrites this code. This is acceptable since the resume driver of the present invention will handle all aspects of any NMI occurrence. Following is a description of the steps necessary to hook both the real mode and protected mode NMI interrupt vectors. A more detailed description placing these processes in the context of the overall resume driver initialization and execution sequence will be described later.

Figure 3:
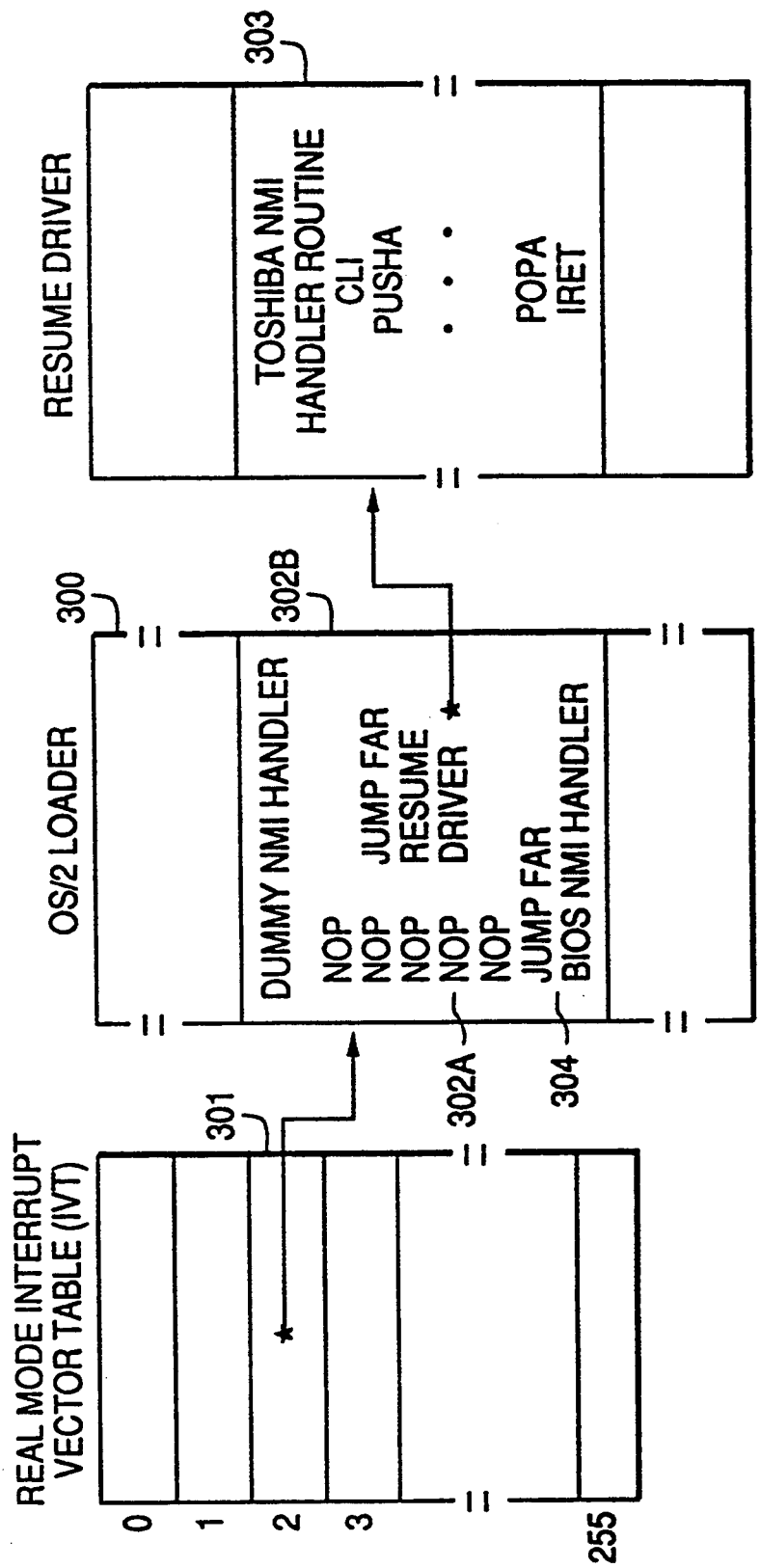
FIG. 3 is a block diagram depicting the process of "hooking" the real mode non-maskable interrupt (NMI) vector according to the present invention.

Referring to FIG. 3, a diagram is shown which illustrates the steps necessary in order to "hook" the real mode NMI vector. Basically, the OS/2 system loader 300 must be modified in order to perform the following functions. First, the loader must save the existing NMI vector which points to the standard resume ROM BIOS. Because the actual NMI vector in the IVT (element 301) cannot be modified because the OS/2 kernel polices any changes made, the first step of the original handler should be changed to jump to a far address corresponding to the resume driver of the present invention. However, because the original handler resides in the ROM BIOS (and hence may not be modified), the next best solution is to modify the IVT entry for the real mode NMI in the loader itself. This will fool the kernel into thinking that this new vector is the proper vector. Unfortunately, at load time, there is no way of determining where the resume driver will eventually be placed into memory, so the IVT NMI vector (element 301) is simply pointed to a dummy handler within the loader itself, as depicted in FIG. 3. The dummy handler will consist of five NOP (no-operation) instructions followed by a far jump to the BIOS NMI handler, as depicted in elements 302A and 304 of FIG. 3.

Thus, whether or not the host computer system supports the resume functionality of the present invention, the real mode NMI vector will point to the dummy handler routine created in the loader. If it is subsequently determined that the computer does not support the present invention, the resume driver of the present invention will not load and the five NOP instructions will remain. Thereafter, when a resume NMI occurs, the computer will jump to the dummy handler, execute the five NOP instructions, and then jump to the original ROM BIOS resume routines.

However, if the computer system supports the OS/2 resume driver of the present invention, the resume driver will be loaded into memory, and the five NOP instructions will be patched over to execute a jump instruction to the resume driver of the present invention, as depicted by elements 302B and 303). Thereafter, when a resume NMI occurs, the computer will jump to the dummy handler and will then immediately jump to the resume driver of the present invention pursuant to the patched jump instruction.

Figure 4:
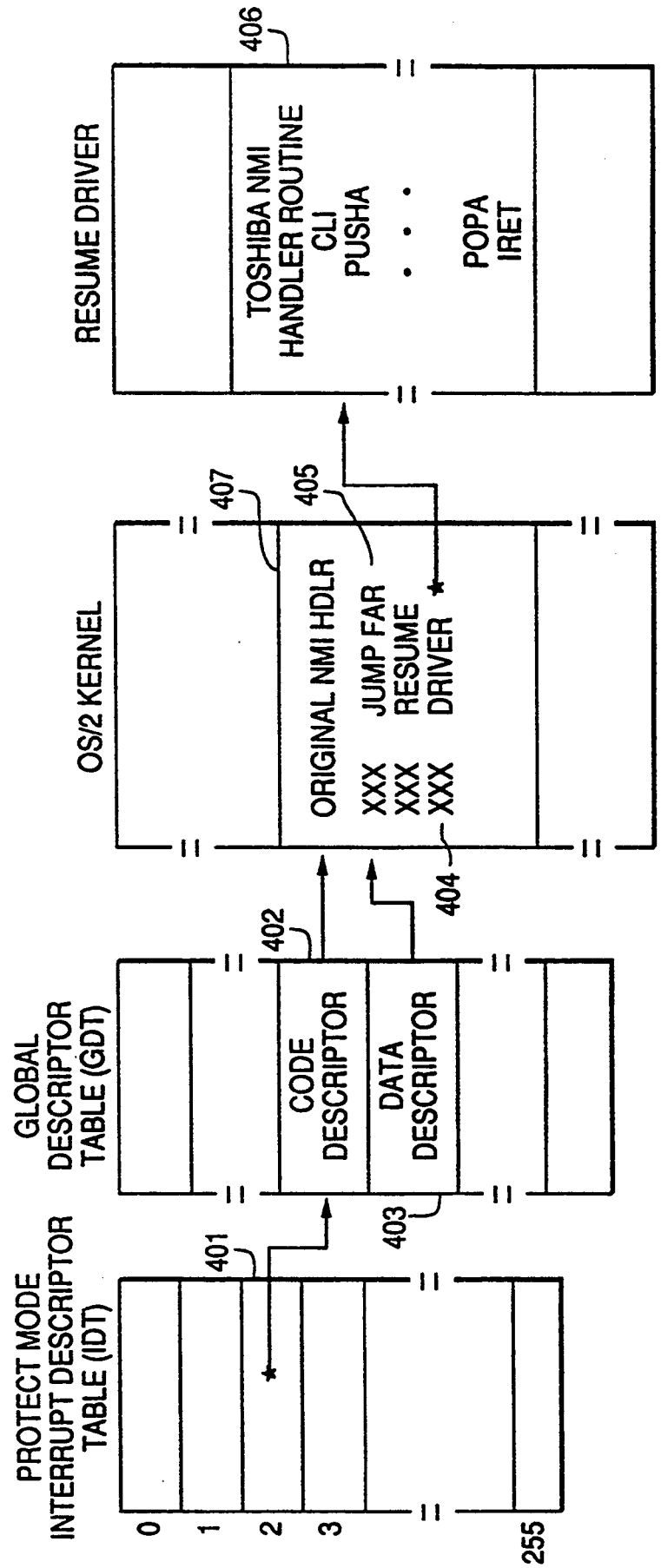
FIG. 4 is a block diagram depicting the process of "hooking" the protected mode NMI vector according to the present invention.

In order to hook the protected mode NMI interrupt vector, additional steps must be taken which are analogous to the steps necessary to hook the real mode NMI interrupt vector. FIG. 4 provides a visual depiction of the steps necessary to hook the protected mode NMI interrupt vector. First, the address of the original protected mode NMI handler within the kernel (element 407 in FIG. 4) must be obtained from the interrupt descriptor table (IDT) (located at element 401 in FIG. 4). Because this address references a code segment, write access is restricted into this segment.

Therefore, to get around this limitation, the code selector obtained from the IDT must be used to index into the global descriptor table (GDT) (code descriptor 402) in order to obtain the physical memory address of the original handler. Once this is done, the physical address may be converted to a virtual address via a generic "Dev_Help" function (e.g. "DevHlp_PhysToVirt"), all of such "Dev_Help" functions allowing for the interface between the device drivers and the OS/2 kernel. By default, "DevHlp_PhysToVirt" returns a selector which references a data descriptor (element 403). The "Dev_Help" functions and associated documentation for utilizing these functions are included with the development software associated with OS/2, available from Microsoft Corporation of Redmond, Wash., and their availability may be "INCLUDED" into the resume driver code with the appropriate "INCLUDE" commands.

Because the selector references a data descriptor, it is now possible to overwrite the first instructions of the original NMI handler (element 407). A far jump instruction is patched (element 405) using the resume driver's protected mode code selector and the NMI handler routine's offset as the destination of the jump (thus jumping to element 406 in FIG. 4). As opposed to the "hooking" of the real mode NMI vector, in this case we are actually patching over existing code (not NOP instructions) (element 404), and thus the original protected mode handler will never be able to be used. This is acceptable because the only function that the original handler performed was to display a register dump and trap message and then halt the system when an NMI occurred.

In addition to the modifications to the OS/2 system loader as described above, the OS/2 disk device driver must be modified in order to fully support the resume functionality of the present invention. This is necessary because the standard resume routines found in the ROM BIOS expects certain registers to be modified by the disk BIOS. However, under the protected mode of OS/2 Version 1.2, the disk BIOS code is not used. Accordingly, modifications must be made to the disk driver in order to perform the steps described below. The modifications to the disk driver according to the preferred embodiment described below are relatively simple in scope, and one of ordinary skill will be able to make these modifications to the OS/2 disk driver code.

At initialization time, the disk driver according to the preferred embodiment of the present invention determines if it is running on a computer system, such as the Toshiba T3100SX laptop computer, capable of supporting the resume functionality of the present invention. If it is capable of supporting the present invention, a resume flag is set, and the following steps are executed regardless of whether the resume driver of the present invention is actually loaded. If, for some reason, the resume driver is not actually loaded, no adverse side effects will occur, as will be explained in further detail later.

First, another flag is set before every disk access and it is cleared when the disk access is completed. Accordingly, the resume BIOS will be able to determine, by checking this flag, whether the hard disk drive (HDD) is currently active or not. If the HDD is currently active, the resume BIOS will set a bit in the power NMI mask register and exit, thereby returning control to the resume driver of the present invention (which also exits). After finishing any disk access and before checking the request queue, the disk driver sets a bit in the power NMI register. If the corresponding mask register bit has been set by the resume BIOS, another NMI will be generated. This time, however, the resume BIOS will find that the HDD is inactive, and will be able to execute the normal resume BIOS routine code and power down the machine. When power is subsequently restored, the disk driver will pick up where it left off (i.e. checking to see if it has any queued requests).

Finally, the last OS/2 component which must be modified in order to implement the present invention is the OS/2 system initialization code. In a preferred embodiment, the resume driver of the present invention consists of an installable device driver. In the preferred embodiment, this installable device driver is named "RESUME.SYS", although any other name could, of course, be used as well. Furthermore, the resume functionality of the present invention is only able to operate on a computer system, such as the Toshiba T3100SX, which includes an intelligent power supply and is capable of operating under OS/2 Version 1.2. Therefore, the installation code must be modified so that the resume driver is installed only when an appropriate machine is detected. In order to minimize intervention necessary by the user to install the resume driver, the modification to the installation code, in the preferred embodiment, is designed to be transparent to the user. This modification is described below.

In order to place the resume driver code onto the distribution diskettes to be included with the relevant computer system, the BUILD.CMD and MKOS2.CMD command files associated with OS/2 development must be modified. BUILD.CMD has to be modified to (1) go to the resume sub-directory and assemble and link the resume driver code, and (2) pack the final RESUME.SYS file under the binary DISK 2 sub-directory (DISK 2 is chosen because this is where the other installable drivers reside under OS/2 Version 1.2. Of course, any other disk could be used as well). MKOS2.CMD is responsible for generating the OS/2 installation diskettes, and must be modified to copy the resume driver (e.g. RESUME.SYS) onto installation DISK 2.

The file SYSINST.MS holds a complete list of all files which are copied (or unpacked) from the installation diskettes onto the user's hard disk drive under the appropriate sub-directory. This file is used at initialization time by the OS/2 installation program (SYSINST2.EXE under OS/2 Version 1.2). The resume driver's binary filename will be listed in the list for DISK 2.

Finally, SYSINST2.EXE must be modified to (1) determine if an appropriate computer is being used (e.g. Toshiba T3100SX), and if so, (2) edit the user's CONFIG.SYS file to load the resume driver. The OEMHLP function 81 (hex) (e.g. Get Machine Type and Mode) may be used to identify the machine being installed. SYSINST2.EXE must further be modified to place the following command line in the CONFIG.SYS file, if the machine is able to support the resume driver:

DEVICE=C:\OS2\RESUME.SYS

The actual resume driver of the present invention itself, according to the preferred embodiment, performs initialization in part to "hook" the real mode and protected mode NMI vectors, as described previously, and forms the destination address which is executed after an NMI is received. FIGS. 5, 6 and 7(a)-7(e) depict flow charts which describe the steps which are executed when the resume driver is first initialized and when subsequently executed upon the occurrence of an NMI. These Figures will be described in succession below.

Figure 5:
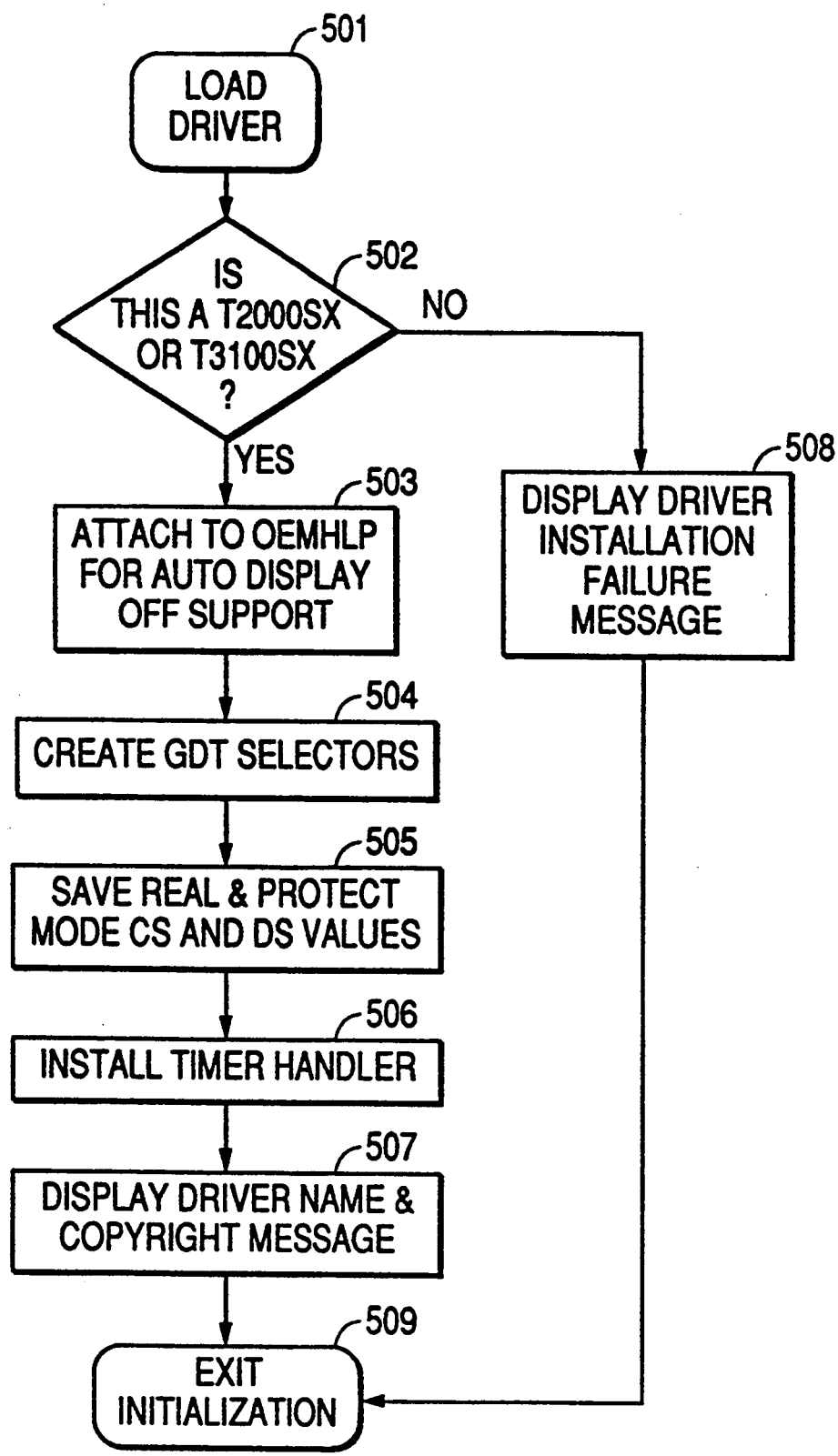
FIG. 5 is a flow diagram showing the various steps necessary to install the OS/2 resume device driver, including installing a timer handler, according to a preferred embodiment of the present invention.

Referring to FIG. 5, steps 501–509 are shown which comprise the initialization steps which are first executed when the resume driver is loaded. Step 501 refers to the process of loading the resume driver (RESUME.SYS in the preferred embodiment) which is handled by the OS/2 device driver loader during the system start-up. The line "DEVICE=C:\OS2\RESUME.SYS" is read from the CONFIG.SYS file, and the resume code and data are loaded into memory. Execution is transferred to an initial routine with an initialized command request packet. Execution is then passed to a driver initialization procedure to complete the resume driver's initialization.

The resume driver initialization routine performs various functions. First, step 502 determines whether the host computer system is a type of computer system which supports the resume function of the present invention. This determination may be made by reading the appropriate memory locations containing codes specifying which type of computer system is present (e.g. ROM BIOS address F000:FFFA for the Toshiba line of computers), and by reading the appropriate memory locations indicating whether the standard ROM BIOS resume function is supported (e.g. ROM BIOS address F000:E024, et seq., on Toshiba computers). Specifically, the computer system must be able to operate under the OS/2 operating system (for example, a computer system with an 80268-compatible microprocessor—CPU 101 in FIG. 1), it must have an intelligent power supply circuit (element 117 in FIG. 1), and it must have an existing resume processing functionality with its ROM BIOS. In a preferred embodiment, either the Toshiba T3100SX or T2000SX laptop computers satisfy this criteria, and therefore step 502 makes specific reference to these machines. However, any other computer system operating under OS/2 with an intelligent power supply may be used to implement the present invention, as well, and the T3100SX and the T2000SX are mentioned for illustrative purposes only.

If an appropriate computer system is not detected, as in step 508, a driver installation failure message is displayed to the user, and the initialization process is ended (step 509).

On the other hand, if an appropriate computer system is detected, OEMHLP is attached to in order to support the "auto display-off" feature (which may be called via a hex 88 IOCtl call to OEMHLP), as indicated in step 503. In a preferred embodiment, this may be accomplished by moving the offsets of the OEMHLP file name (e.g. OEMHLP$) and the accompanying OEMHLP data (e.g. both the real mode and protected mode code entry point and data segment) into the BX and DI registers, respectively, and thereafter attaching to OEMHLP by calling an appropriate "Dev_Help" (e.g. DevHlp_attached). Thereafter, a generic OEMHLP Input/Output Control (IOCtl) request packet data may be loaded into the memory locations reserved for the request packet, thereby eliminating the need to re-load this information at each interrupt time. Such data includes the packet length, the packet command, the GIO category, the GIO function, etc.

After step 503 is executed, step 504 is encountered, as shown in FIG. 5. Step 504 consists of creating global descriptor table (GDT) memory segment selectors, in accordance with the standard 80286-compatible microprocessor architecture, which point to the GDT itself, as well as creating a dummy selector having a limit of 64K. The GDT selector is used through the resume driver of the present invention to access descriptors in the GDT. Finally, the dummy selector is used when switching to real mode, as will be described later.

First, the selector pointing to the two selectors are created using an appropriate function (e.g. "DevHelp_AllocGDTSelector") of the "Dev_Help" functions. Thereafter, the first selector is made to point to the GDT by loading the appropriate address into the AX and BX registers, loading 0 (for 64K limit) into the CX register, selecting the appropriate selector, and calling an appropriate function (e.g. "DevHlp_PhysToGDTSelector") of "Dev_Help". Finally, the second selector is similarly set to point to a dummy segment with a 64K limit.

After the two selectors are created, as described above, protected mode data, code selectors, as well as the real mode data segment value are saved at the top of the code segment, as depicted in step 505. This information must be kept in the driver's code segment due to the fact that, when an NMI occurs and execution transfers to the resume driver, the DS register will still be pointing to the data segment of the task that was interrupted. Specifically, the following steps are performed in order to save the above data into the code segment: (1) The physical address of the top of the GDT is retrieved and converted into a virtual address through the "Dev_Help" functions (e.g. DevHlp_PhysToVirt), (2) The descriptor type is set to be CODE, rather than the default DATA type of the "DevHlp_PhysToVirt" function, (3) Set the attributes of the descriptor to be executable, readable, conforming, and accessible, (4) convert the CS (code segment) physical address to a virtual address with, e.g., the "DevHlp_PhysToVirt" function so that a DATA selector is created, and (5) copy the real mode data segment, the protected mode data selector and the protected mode code selector to previously reserved memory locations within the resume driver CODE segment (e.g. at the top of the CODE segment). At this point, the virtual address of the GDT is converted back to a physical address via an appropriate "Dev_Help" function (e.g. DevHlp_UnPhysToVirt).

After step 505 has been performed, a timer handler is installed as shown in step 506. The timer handler is necessary because certain "Dev_Help" routines cannot run at INIT time. To get around this limitation, a timer handler is set up having the code necessary to hook the protected and real mode NMI vectors, as previously described. The timer handler runs at "ring 0" privilege level of the microprocessor, and therefore has the highest privileges.

In order to set up the timer handler, the offset into the actual timer handler routine (to be described below) is placed in register AX, and a delay (e.g. for example ⅛ of a second) is set up in register BX. An appropriate "Dev_Help" function (e.g. DevHlp_TickCount) is then called to install the timer handler. Thereafter, the timer handler is executed at the appropriate time, as will be discussed in detail below with respect to FIG. 6.

After the timer handler is installed in step 506, step 507 is encountered. First, OS/2 is informed of which part of the resume driver code of the present invention may be discarded after initialization. This is accomplished by loading addresses, corresponding to the last addresses within the code segment and data segment which will be retained after initialization, into appropriate memory locations which will then be used as a pointer to the ends of the appropriate segments. Next, an appropriate driver name and copyright message may be displayed indicating the name of the driver and associated copyright information. This, of course, is optional, but is done in a preferred embodiment in order to indicate the copyrighted nature of the resume driver software.

After 507 has been performed, the initialization process is complete, and accordingly, step 509 is encountered. Any remaining system initialization may be performed by OS/2 at this point, and, finally, the standard OS/2 environment is entered, allowing the user to perform normal operations with respect to the computer system. However, when a power-off request, in the form of an NMI, is received by the intelligent power supply (element 117 in FIG. 1), the resume driver of the present invention is executed. The operation of the main resume driver routine will be described in further detail below, with respect to FIG. 7(a)-(e).

Figure 6:
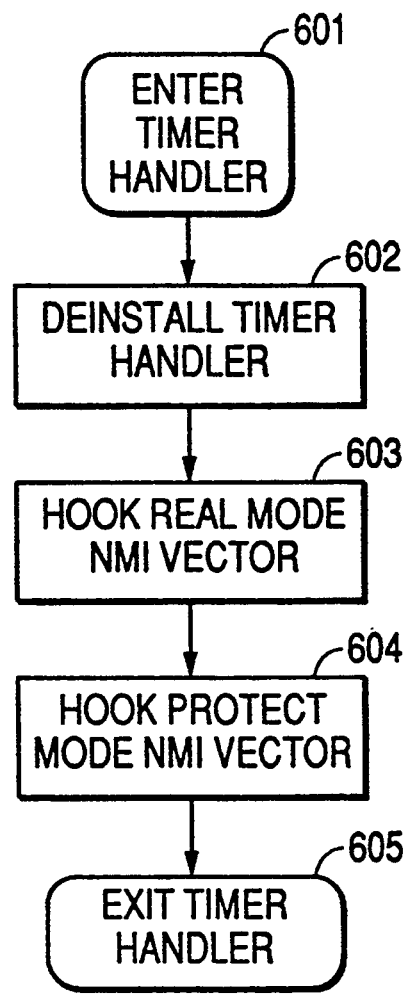
FIG. 6 is a flow diagram showing the various steps performed by the timer handler of FIG. 5, which is necessary to "hook" the real mode and protected mode NMI vectors depicted in FIGS. 3 and 4 in a preferred embodiment of the present invention.

Referring to FIG. 6, the timer handler routine for hooking the real mode and protected mode vectors is shown. This timer handler routine is initially installed by the initialization process, as described above with respect to step 506 of FIG. 5. At the appropriate time, the timer handler routine is executed, as will now be described below.

First, step 601 of FIG. 6 depicts the point in time at which the timer handler is first called. This occurs after the timer handler has been previously installed. As noted above, the timer handler is executed at "ring 0" which corresponds to the highest privilege level of the 80286-compatible microprocessor, in the preferred embodiment.

Step 602 corresponds to the process of de-installing the timer handler after the timer handler routine is entered. The de-installation process may be performed by loading the offset address of the timer handler in the AX register and calling an appropriate "Dev_Help" function (e.g. DevHlp_ResetTimer) to de-install the timer.

Thereafter, step 603 is encountered which entails "hooking" the real mode NMI vector to point to the resume driver of the present invention (see previous discussion with respect to FIG. 3). First, the virtual pointer to the real mode vector table, located at address 0:0, is obtained by utilizing an appropriate "Dev_Help" function (e.g. DevHlp_PhysToVirt). Next, the address of the dummy NMI handler created in the modified OS/2 Loader (OS2LDR), described previously, is obtained in the real mode vector table (INT 2 vector). Thereafter, the five NOP instructions originally placed in the dummy NMI handler are replaced with a far jump to the resume driver of the present invention. For example, the far jump command (EA hex) is placed in the first NOP location, and the offset and segment of the resume driver are placed in the following locations. Thereafter, the virtual address of the real mode vector table is converted back to a physical address with, e.g. the "DevHelp_UnPhysToVirt" function of the "Dev_Help" functions.

In addition to the real mode NMI vector, the protected mode NMI vector must be "hooked" as well (see previous discussion with respect to FIG. 4), as indicated in step 604 of FIG. 6. First, the virtual address of the interrupt descriptor table (IDT) is obtained through the use of an appropriate "Dev_Help" function (e.g. DevHlp_PhysToVirt). Next, the original NMI vector stored within the IDT is obtained and stored in a previously reserved memory location. Because the address of the original NMI vector points within the OS/2 kernel (a CODE segment), write access to the segment is restricted. Accordingly, the code selector obtained from the IDT may be used to index into the global descriptor table (GDT) in order to obtain the physical memory address of the original handler. This value is converted to a virtual address via an appropriate "Dev_Help" function (e.g. DevHlp_PhysToVirt), which, by default, returns a selector which references a DATA descriptor. Therefore, it is possible to overwrite the first instructions of the original handler in order to effectively "hook" the NMI vector.

The previously saved offset which points to the original NMI vector may thereafter be used to determine the offset into the referenced DATA segment (which aliases the NMI handler CODE segment). Using the resulting virtual address, a jump to the far address of the device driver of the present invention may be patched into the beginning of the original protected mode NMI handler. For example, the far jump instruction (EA hex) may be patched into the first location, and the address of the device driver (offset and selector) may be patched into the following memory locations.

After both the real mode and protected mode NMI vectors have been "hooked" in steps 603 and 604, step 605 is encountered, and the timer handler is exited. Once this step has been completed, the OS/2 resume driver of the present invention has been installed, and may be utilized when the user of the computer system presses the power switch, thereby sending an NMI to the CPU. The following discussion describes in detail the various steps which constitute the main routine of the resume driver. Accordingly, these steps are performed during the actual OS/2 resume processing and before the standard resume routines located with the ROM BIOS are executed.

Referring to FIGS. 7(a)-7(e), flow diagrams are shown which depict the resume driver functionality of the present invention in a preferred embodiment. The routine represented by these flow diagrams form the destination routine of the far jump that is effectively patched into the original NMI handlers, as described previously. The routines represented by FIGS. 7(a)-7(e) effectively act as a "wrapper" around the BIOS code. In the event of a resume NMI, the resume driver performs preprocessing before transferring control to the BIOS, and it performs post-processing after the BIOS resume function are completed after the power is subsequently restored. The computer system is actually powered down in the middle of the resume BIOS code.

In the event of an I/O channel check error NMI (parity error), which in the preferred embodiment is the only other type NMI which can occur other than a resume NMI, the resume driver of the present invention performs preprocessing and transfers control to the BIOS, which halts the system. At this point the machine will be halted and the user will have to press the reset button to re-boot the system. The actual execution path followed by the resume driver is the same regardless of the cause of the NMI.

If a CMOS memory location is set indicating that resume processing is activated, then the steps outlined in FIGS. 7(a)-7(e) are executed after the NMI is detected. When the resume driver is first entered (step 701 in FIG. 7(a)), the driver first disables all interrupts (e.g. with the CLI assembly language instruction) as indicated in step 702. This is necessary in OS/2 because INT 2 (e.g. NMI) is a trap gate and not an INT gate.

Next, pursuant with good assembly language programming technique, all registers and flags are saved on the stack with the PUSH-type commands, as further indicated in step 702. Next, the DS register is set to the appropriate value (either segment or selector depending on CPU mode), and the resume driver then saves the current programmable interrupt controller (PIC) mask and then disables the PIC in step 703.

At this point, a determination is made whether the CPU is operating in real or protected mode in step 704. This may simply be accomplished by examining the appropriate bit of the machine status word (e.g. with the SMSW instruction). If the CPU is in the real mode, then execution jumps down to step 708, which will described below.

The processing which occurs when an NMI is detected in protected mode is more complicated than the real mode scenario due to the fact that the CPU's mode of operation must be switched before entering the resume BIOS code. While the BIOS is designed to run in both the protected mode and the real mode in a preferred embodiment on the Toshiba T3100SX computer, the T3100SX BIOS has certain bugs while running in protected mode, so execution in the real mode is preferred.

Two methods exist in preferred embodiments for switching from 80286 protected mode to real mode. First, the "CPU reset method" may be used by generating a triple fault. This method has the virtue of being compatible with the 80286 CPU. The other method is the 80386 CPU mode switch using 80386 instructions. This is a more graceful method in that the CPU (and all its registers) are not reset when switching to real mode, unlike the "CPU reset method". Because the 80386 CPU mode switch instruction method lends itself to a cleaner design, this method is utilized in the preferred embodiment. However, the "CPU reset method" may be used if the host CPU is an 80286 microprocessor, rather than an 80386-compatible microprocessor.

If the CPU is operating in the 80286 protected mode, then steps 705-707 are executed in order to properly place the CPU into real mode. However, on some machines having certain quirks in their BIOS, initial steps must first be taken.

For example, if the resume driver of the present invention is operating on a Toshiba T3100SX laptop computer, the following steps must first be executed because of BIOS deficiencies: (1) The monitor processor (MP) and task switched (TS) bits of the MSW must be cleared in order to prevent "co-processor not present exceptions" from occurring, (2) the task state register (TSR) is saved and the task is marked "not busy" so that the BIOS code will not hang waiting for it to finish, and (3) the local descriptor table register (LDT register) must be saved into a previously reserved memory location because the BIOS apparently doesn't do this. These and other BIOS code deficiencies present on the T3100SX may or may not be present on other machines as well. If other such deficiencies are discovered on other machines, then appropriate measures, such as those taken above, necessarily must be taken.

If the CPU is operating in the protected mode, then the following steps 705-707 must be taken in order to switch it into the real mode. First, in step 705, a flag representing that the CPU mode is about to be switched from protected mode to real mode is set. This will be used when power is subsequently restored to indicate that the mode must be switched back to protected mode from real mode. Also in step 705, the registers associated with the protected mode, namely SS and SP, are saved in previously reserved memory locations.

In step 706, the SS and SP registers are modified to point to the local stack in the resume driver's data segment. Finally, in step 707, the CPU is switched to real mode. The steps necessary to accomplish the switch in the preferred embodiment are described below. The described steps follow the steps outlined in the Intel 80386DX Programmer's Reference Manual on page 14-4, available from Intel Corporation.

First, the resume driver's code segment limit is patched to be 64K, while saving the current code segment limit. A far jump is then performed to the next instruction in order to load the CS register with the new segment limit. This may be simulated, in the preferred embodiment, by pushing the CS register onto the stack, pushing the next instruction offset onto the stack, and then executing the RETF instruction. Because the RETF instruction pulls the "return" address off the stack, the next instruction is executed after the "return" is executed.

Next, the segment registers are loaded with a dummy selector value previously set up at initialization time. At this point, both interrupts and NMIs have been disabled (interrupts being previously disabled, and NMIs disabled by virtue of the present routine being handled as an NMI).

Using special 80386 instructions (assuming the CPU is 80386-compatible), the protected mode enable (PE) bit in control register 0 (CR0) may be cleared, thus putting the CPU into the real mode. The Microsoft Macro Assembler 80386 instructions/macros used in the preferred embodiment, are the following:

```
MOV     EAX,    CR0
AND     EAX,    NOT 1
MOV     CR0,    EAX
```

However, other similar instructions may be used on non 80386-compatible machines to accomplish the same effect.

After the PE bit is cleared, a far jump must be immediately executed (of course using real mode addressing) to the next instruction in order to flush the instruction queue and to put the appropriate value into the CS register.

Next, the IDT must be loaded with the base and limit of the real mode interrupt vector table (IVT). Finally, the segment registers DS, ES, and SS are loaded with the real mode address of the driver's data segment. Interrupts are not re-enabled at this point because they need to remain disabled until the resume driver returns to the interrupted process.

When step 708 is reached, either after step 704 if the CPU was originally in the real mode, or after steps 705-707 if the CPU was originally in the protected mode, the direction flag must be cleared with the CLD instruction, if operating on a Toshiba computer according to the preferred embodiment. This is due to an apparent bug within the resume BIOS on these machines. However, on other machines, this instruction might not be necessary.

Figure 7A:
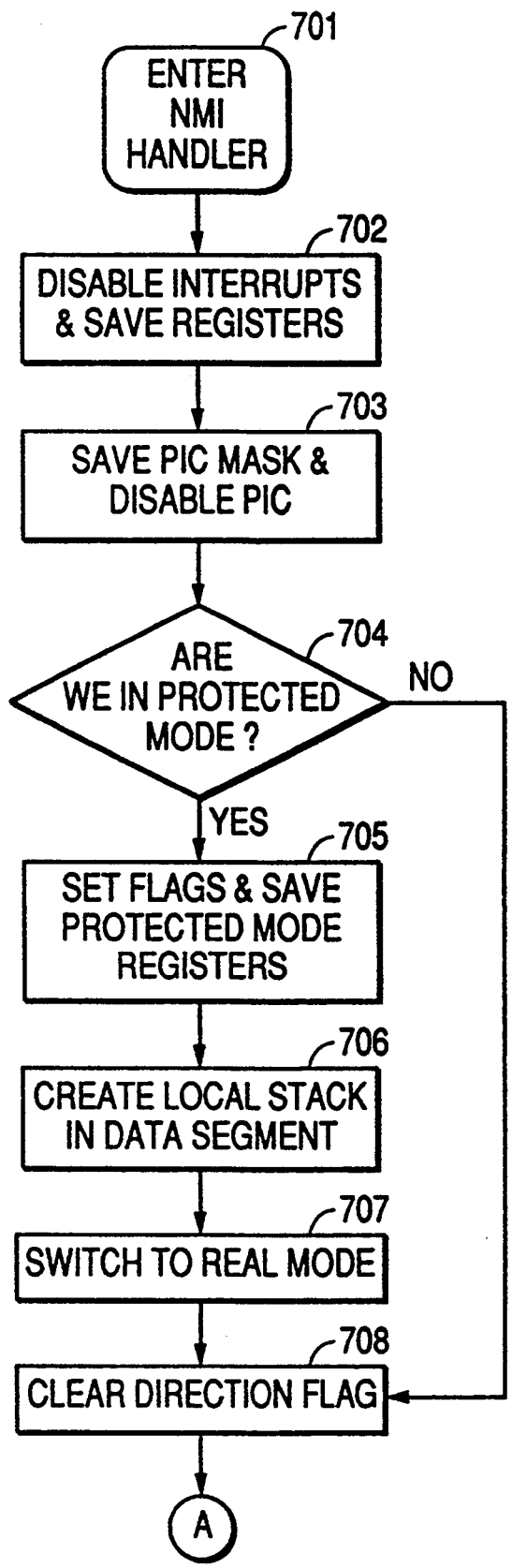

Referring to FIG. 7(b), the resume driver execution process is continued from FIG. 7(a). After the appropriate steps in FIG. 7(a) are performed, step 709 is encountered, as depicted in FIG. 7(b). Step 709 involves determining whether the floppy drive is active. This determination should be made in a preferred embodiment in order to guard against the dangerous condition whereby the floppy drive is active when the resume functionality occurs and the user changes the floppy disk in the floppy drive before the power is subsequently restored. If this were to happen, the computer would not realize that the floppy disk was changed and could continue to perform a write operation on the new floppy based upon the old floppy's contents. This, obviously, could have disastrous effects.

Therefore, the resume driver in step 709 checks to see if the floppy drive is active by checking the floppy motor status port (bit 5 of port 0E5 hex). If the floppy motor is active, then the floppy drive is reset in step 710 (on Toshiba computers, the resume BIOS will fail if the floppy drive is active). Otherwise, if the floppy drive is not active, then the system flags are pushed onto the stack to be restored when the IRET instruction is encountered in the resume BIOS after power is restored. At this point, step 711 is encountered and the resume driver may jump into the original BIOS resume code by using the previously saved address of this code. The original BIOS resume code performs its standard resume processing function and eventually, the intelligent power supply (element 117 in FIG. 1) powers the computer off in step 712.

Figure 7C:
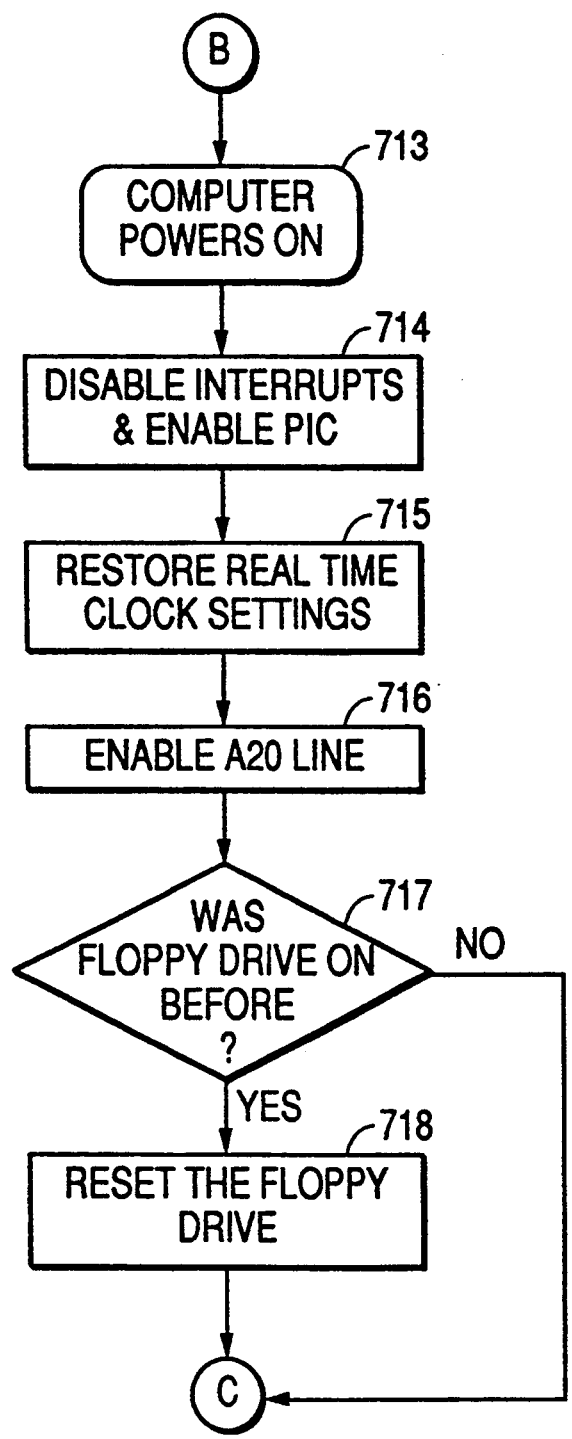

At any time after the computer has been powered off in step 712, the user of the computer system may signal the intelligent power supply that the computer is to be powered back on, as indicated in step 713 of FIG. 7(c). The user may so indicate by pressing the same power switch (element SW in FIG. 1) as was used to power the system down. When this switch is pressed, the computer resumes executing the BIOS resume code where it left off. The BIOS resume code performs its respective processing to restore the real mode registers and data and then transfers control back to the resume drive of the present invention at the point after the resume drive had called the BIOS.

After the BIOS resume code returns control to the resume driver, the resume driver performs step 714. Step 714 involves disabling the interrupts (e.g. with the CLI instruction) because, according to the preferred embodiment, the resume BIOS has turned them back on. In addition, step 714 involves enabling the PIC mask to its state which was saved when the PIC was previously disabled.

The CMOS real time clock settings must be specifically reset for OS/2 by the resume driver, as depicted by step 715, because the BIOS code does not perform this function. For example, on the T3100SX computer: (1) the time-base frequency is set to 32,768 KHz, (2) the rate selection bits are set so that the interrupt rate is every 31.25 ms, and (3) periodic interrupts, update ended interrupts, and 24-hour mode interpretation are turned on. In this case, appropriate instructions would be executed to achieve these effects.

In addition to the above steps which must be performed upon return from the resume BIOS, address line 20 (A20) must be enabled in step 716 because the BIOS code disables it in the preferred embodiment. Generally, in real mode gate A20 is disabled. However, Toshiba's OS/2 works with it enabled. Thus, when returning from the BIOS, gate A20 must be enabled so that OS/2 may continue normal execution. Gate A20 may be enabled by using the keyboard controller (KBC) (element 114A in FIG. 1). In a preferred embodiment, the KBC comprises an Intel 8042 chip. Because the 8042 is such a slow chip compared to an 80386 CPU of the preferred embodiment, dealing with the KBC is an arduous task. Specifically, the gate A20 may be enabled by: (1) waiting for the keyboard controller input buffer (KBC input buffer) to become empty, (2) requesting to write to the output port, (3) waiting for the KBC to process the command, (4) sending a byte with bit 1 set to the KBC's output port, and (5) waiting for the A20 gate to "settle down" by sending a "null pulse output port" command to the KBC until after gate A20 has been enabled. For details on the previous description, the IBM AT Technical Reference Manual (available from International Business Machines), pp. 1-51, 1-53, and 1-55 may be consulted.

Step 717 makes a determination, based upon the previously saved status flag, whether the floppy drive was active when the resume function was initiated. If the floppy drive was active, then step 718 resets the floppy drive again, so that the OS/2 disk driver is aware that something (e.g. the resume process) has happened, and so that an alert box is displayed to the user saying, to the effect, "Floppy drive not ready" (e.g. Device A:). If the floppy drive was not previously active, then this resetting step is bypassed.

Figure 7D:
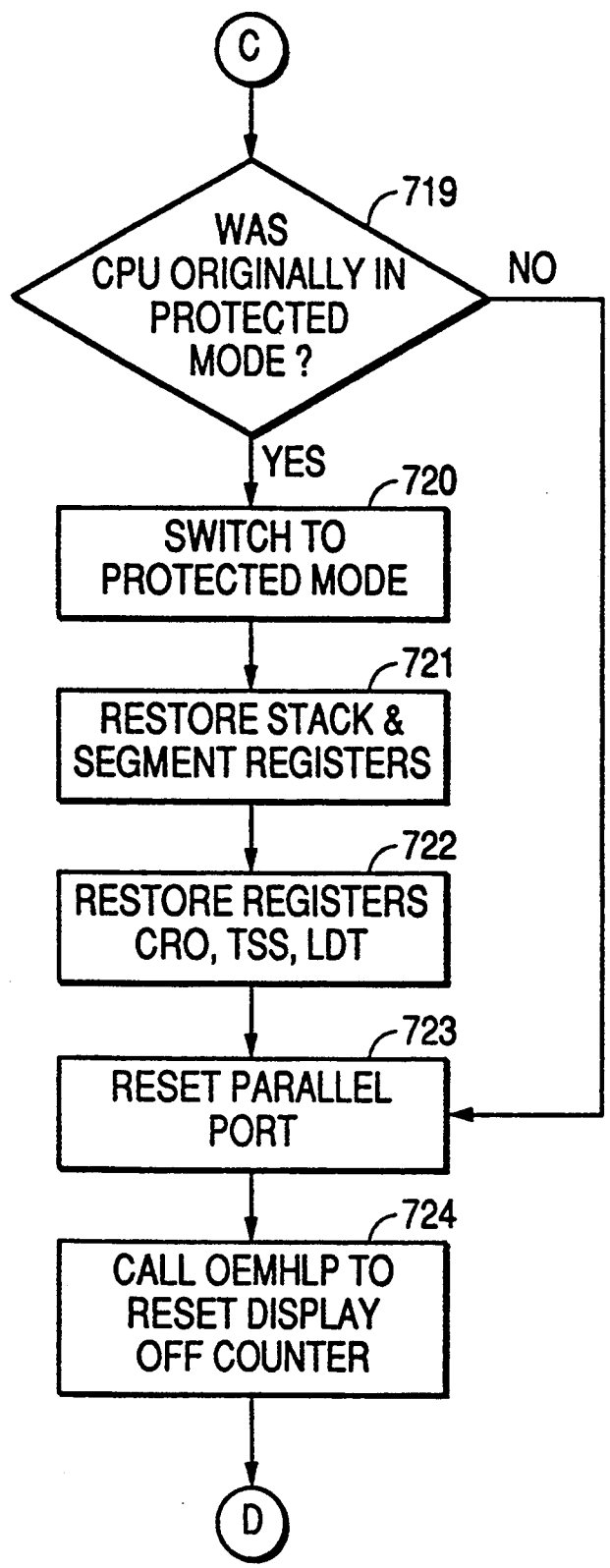

Continuing on to step 719 of FIG. 7(d), a determination is made whether the CPU was originally in protected mode. This is accomplished by checking the previously-saved flag indicating that the original CPU mode was switched. If the CPU was in fact originally in protected mode, then step 720 is executed. The mode switch flag indicating that the mode was switched is cleared. Thereafter, the previously-saved IDT register value and GDT register value are restored (e.g. with the LIDT and LGDT instructions). In addition, the protected mode code and data selectors are retrieved and the MP and TS bits are restored and the PE bit is set in a machine status word memory location, and this value is stored into the actual machine status word, thereby switching the CPU into the protected mode. Finally, the CS register is loaded with an appropriate protected mode value by pushing the protected mode code selector and the offset of the following instruction onto the stack and executing a RET instruction.

Step 721 is performed by restoring the previously saved stack selector and pointer and restoring the protected mode DS and ES registers. Next, step 722 restores CR0, TSS and LDT. Step 722 loads the current task's previously saved task register (TR) and restores the tasks LDT register (because the resume BIOS doesn't save it). The previously saved code segment limit is then patched into the driver's code descriptor.

Whether the CPU was switched back to the protected mode or not, step 723 is executed. Step 723 allows for printing to continue on the parallel printer port after resuming. Normally, OS/2 misses the printer hardware interrupt or the printer interrupt does not occur anymore after resuming. In order to get around this, an EOI command is sent to the printer device (IRQ7) and IRQ7 is enabled. Thereafter, the strobe is set high, a delay occurs, and the strobe is set low.

Step 724 comprises a call to OEMHLP function IOCtl 88 (hex) to reset the Auto Display power off counter found in a preferred embodiment on Toshiba computers, as well as on certain other computers. The auto display off feature normally automatically turns the computer's display off after a preset period of time of keyboard and/or mouse inactivity. If a power-down request is detected when the resume mode is enabled, the period of inactivity timer would not be reset when the power is subsequently restored. Therefore, the display might turn off after only a short time when the computer is resumed, an undesirable condition. In a preferred embodiment of the present invention, the auto display power off counter is reset with the IOCtl 88 (hex) OEMHLP function at step 724 after power is resumed. In this way, the display off counter will reset after resuming. Step 724 may be accomplished by pointing to an appropriate IOCtl packet with ES:BX and by calling the OEMHLP function.

The next step executed after this point is step 725 of FIG. 7(e). This step comprises restoring the previously saved system flags and registers, which were pushed onto the stack before the power was removed. After step 725 has executed, the resume process is complete and step 726 indicates that the resume drive returns control to the OS/2 active task by using the IRET instruction.

As can be seen from this detailed description, a preferred embodiment has been described for implementing the present invention on a Toshiba laptop computer, such as the T3100SX or T2000SX. However, as will be apparent from one of ordinary skill in the art of computer programming and/or computer hardware design, the present invention could, just as easily, be implemented on any computer system having an advanced microprocessor, an intelligent power supply circuit, and a preexisting resume processing function for the basic "real" mode of the microprocessor. In addition, the specific ordering of the various steps described previously is largely a matter of discretion, and except for where otherwise noted, may ordered in a multitude of ways. Finally, while the preferred embodiment of the present invention was designed to operate under OS/2, a resume driver could be designed for use with any other advanced operating system, such as UNIX, etc., and any other advanced microprocessor, such as the Motorola 680x0, etc., by simply modifying the appropriate types of data associated with the operating system and/or microprocessor stored and retrieved in the various steps of the present invention.

What is claimed is:

1. An apparatus for setting a periodic interrupt rate of a real time clock in a computer system, having an operating system, comprising;
   a power-up signal detector for indicating that computer system information is to be reset;
   an enabler, responsive to said power-up signal detector, for enabling an A20 address line; and
   a clock setter, responsive to said power-up signal detector, for configuring the real time clock such that the periodic interrupt rate is set to a specified periodic interrupt rate for the operating system.

2. The apparatus of claim 1, wherein said enabler is a keyboard controller.

3. An apparatus for use in a computer system having 1) a CPU capable of operating in a real mode and a protected mode, 2) an adjustable real time clock having a periodic interrupt rate, and 3) an operating system using a specified periodic interrupt rate and capable of operating in the real mode and the protected mode, said apparatus capable of resetting information indicative of a prior state of the computer system, comprising:
   power-up signal detection means for indicating that computer system information is to be reset; and
   configuration means, responsive to said power-up signal detection means, for configuring the real time clock such that the periodic interrupt rate is reset to the specified periodic interrupt rate for the operating system.

4. The apparatus of claim 3, further comprising enabling means, responsive to said power-up signal detection means, for enabling an A20 address line.

5. The apparatus of claim 4, wherein said enabling means utilizes a keyboard controller to enable said A20 address line.

6. The apparatus of claim 3, wherein said configuration means sets the periodic interrupt rate of the real time clock to correspond to the OS/2 operating system.

7. A computer system capable of resetting itself to a prior state, comprising:
   CPU means capable of operating in a real mode and a protected mode;
   real time clock means having a periodic interrupt rate;
   operating system means capable of operating in connection with said CPU means,
      said operating system means using a specified periodic interrupt rate;
   power-up signal detection means for indicating that the prior state is to be reinstated;
   configuration means, responsive to said enabling means, for configuring the real time clock such that the periodic interrupt rate is set to the specified periodic interrupt rate for the operating system.

8. The computer system of claim 7, further comprising enabling means, responsive to said power-up signal detector means, for enabling an A20 address line.

9. A method for resetting and configuring a real time clock in a computer system having 1) a CPU capable of operating in a real mode and a protected mode, 2) an adjustable real time clock having a periodic interrupt rate, and 3) an operating system using a specified periodic interrupt rate, comprising the steps of:
   (1) receiving an indication that computer system information is to be reset; and
   (2) configuring the real time clock such that the periodic interrupt rate is reset to the specified periodic interrupt rate for the operating system.

10. The method of claim 9, further comprising the step of enabling an A20 address line in response to said step (1).

11. The method of claim 10, wherein said step (2) comprises the step of utilizing a keyboard controller to enable said A20 address line.

12. The method of claim 11, wherein said step of utilizing a keyboard controller comprises the steps of:
   (3) waiting for a keyboard controller input buffer of said keyboard controller to become empty;
   (4) requesting to write to an output port;
   (5) sending a byte with bit 1 set to said output port; and
   (6) sending a null pulse output port command to the keyboard controller after said A20 address line has been enabled.

* * * * *

UNITED STATES PATENT AND TRADEMARK OFFICE
CERTIFICATE OF CORRECTION

PATENT NO. : 5,339,426
DATED : August 16, 1994
INVENTOR(S) : Kinya Aoshima

It is certified that error appears in the above-indentified patent and that said Letters Patent is hereby corrected as shown below:

On the title page, insert the following:

Related U.S. Application Data
--[62] Continuation of Ser. No. 707,044, May 29, 1991, Pat. No. 5,297,282.--; and in Column 1, line 4, insert the following:

--The subject application is a continuation of U. S. patent application Ser. No. 707,044, filed May 29, 1991, now U.S. Pat. No. 5,297,282.--

Signed and Sealed this

Fourth Day of April, 1995

*Attest:*

BRUCE LEHMAN

*Attesting Officer*     Commissioner of Patents and Trademarks